United States Patent [19]

Sugiyama

[11] Patent Number: 5,062,278

[45] Date of Patent: Nov. 5, 1991

[54] AIR-CONDITIONING APPARATUS INCLUDING AN INDOOR UNIT AND AN OUTDOOR UNIT HAVING ITS COMPRESSOR DRIVEN BY A THREE-PHASE AC POWER SUPPLY

[75] Inventor: Akiyoshi Sugiyama, Fuji, Japan

[73] Assignee: Kabushiki Kaisha Toshiba, Kawasaki, Japan

[21] Appl. No.: 636,429

[22] Filed: Dec. 31, 1990

[30] Foreign Application Priority Data

Feb. 23, 1990 [JP] Japan ..................... 2-40919

[51] Int. Cl.$^5$ .............. F25B 49/02; H02H 7/00
[52] U.S. Cl. ...................... 62/230; 62/126; 361/22; 361/85
[58] Field of Search ............ 62/230, 126, 129; 324/83 R, 107, 108, 521; 340/532, 658; 361/22, 23, 30, 31, 33, 85

[56] References Cited

U.S. PATENT DOCUMENTS

| 3,611,050 | 10/1971 | Weber | 317/148.5 B |
| 4,393,430 | 7/1983 | Hughes | 361/85 X |
| 4,557,114 | 12/1985 | Kato et al. | 62/230 X |
| 4,802,053 | 1/1989 | Wojtak et al. | 361/85 |
| 4,823,226 | 4/1989 | Reed et al. | 361/85 |
| 4,968,338 | 11/1990 | Sugiyama | 62/126 |

FOREIGN PATENT DOCUMENTS

| 61-114275 | 7/1986 | Japan. |
| 63-209426 | 8/1988 | Japan. |
| 1450419 | 9/1976 | United Kingdom. |

Primary Examiner—Harry B. Tanner
Attorney, Agent, or Firm—Cushman, Darby & Cushman

[57] ABSTRACT

An air-conditioning apparatus includes a control circuit adapted to detect, from among first to third line voltages of a three-phase AC power supply, the second or third line voltage not synchronizing with a serial signal. The control circuit detects a difference between a phase angle of the detected line voltage and that of the serial signal, compares the difference with set values and determines, by that comparison, whether the three-phase AC power supply is in a positive-phase sequence or in a negative-phase sequence. The operation of a compressor is inhibited when the negative-phase sequence is determined by the control circuit.

8 Claims, 5 Drawing Sheets

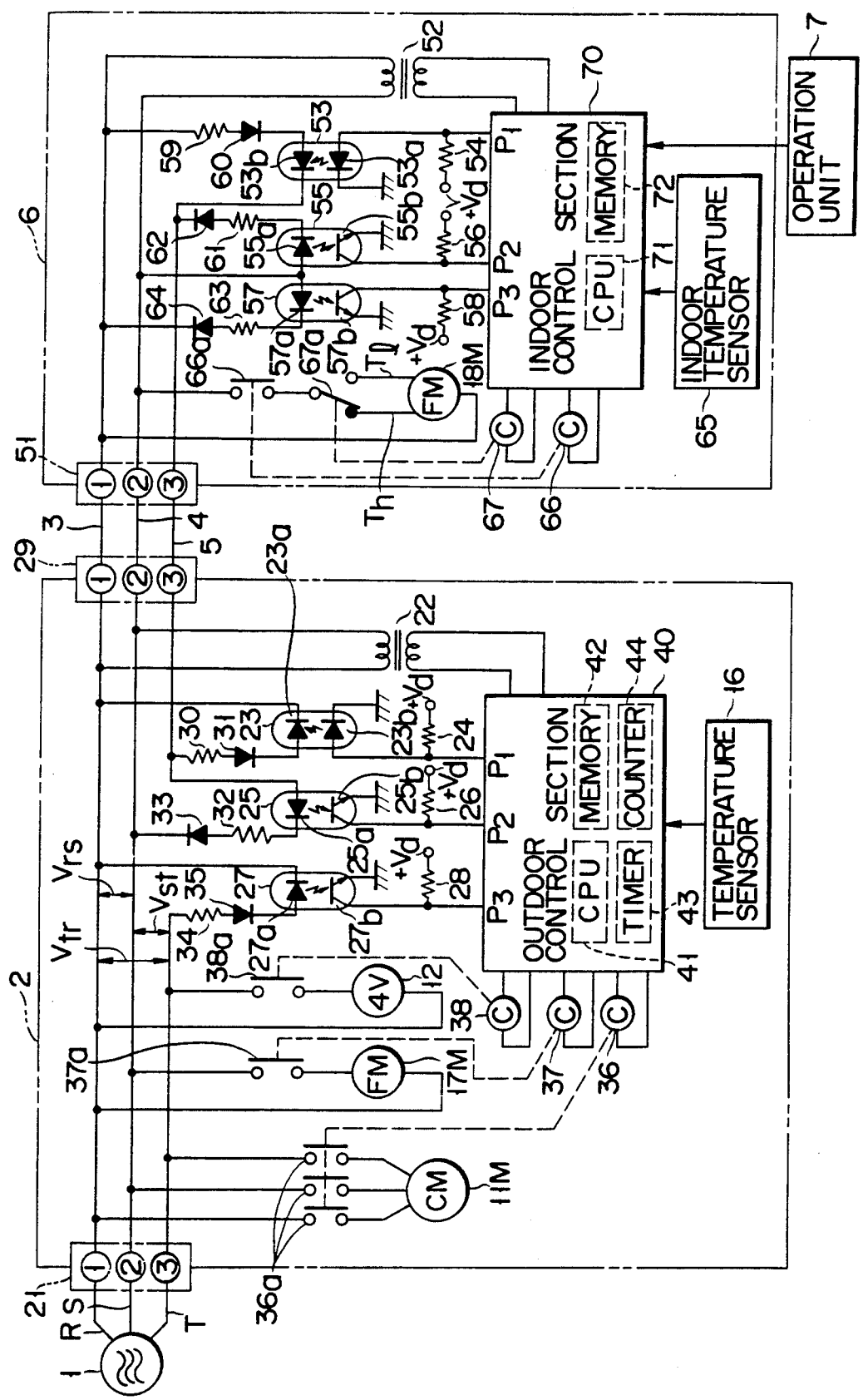
F I G. 3

AIR-CONDITIONING APPARATUS INCLUDING AN INDOOR UNIT AND AN OUTDOOR UNIT HAVING ITS COMPRESSOR DRIVEN BY A THREE-PHASE AC POWER SUPPLY

BACKGROUND OF THE INVENTION

1. Field of the Invention

The present invention relates to an air-conditioning apparatus including a compressor driven by a three-phase AC power supply.

2. Description of the Related Art

Rotary- and scroll-type compressors are known in the art which are driven by a three-phase AC power supply.

The use of the three-phase AC power supply sometimes causes a fault, such as a interphase short-circuiting and electrical disconnection. Upon the occurrence of such a defect, there arises a negative-phase sequence, that is, an unbalance of a phase current in the respective phase of the three-phase AC power supply.

Upon the arising of the negative-phase sequence, a torque as opposed to a normal torque is generated in a drive motor of a compressor, lowering the operation efficiency of the drive motor and hence generating an abnormal operation at the compressor.

In order to overcome such an inconvenience, a reverse rotation preventing device is provided, for example, in an air-conditioning apparatus shown in Published Unexamined Japanese Patent Application 1-114275.

That is, in this air-conditioning apparatus, a compressor 1 of the outdoor unit 11 is driven by a three-phase AC power supply 1a and the reverse rotation preventing device 10 is connected to the three-phase AC power supply 1a. The reverse rotation preventing device 11 detects the negative-phase sequence of the three-phase AC power supply 1a and serves to interrupt the power supply to the compressor 1.

The air-conditioning apparatus of the aforementioned Japanese Patent Application has the double function of interrupting the power supply to the compressor 1 and operating an alarm device 13.

In an apparatus as shown in Published Unexamined Japanese Patent Application 63-209426, a reverse rotation preventing device 17 is connected to a three-phase AC power supply. The reverse rotation preventing device 17 is comprised of a resistor 14, capacitor 15 and relay 16 and adapted to connect a motor 12 to a three-phase AC power supply through an energized relay when the three-phase AC power supply is in a positive-phase sequence and to disconnect the motor 12 from the three-phase AC power supply through the relay in deenergized state when the three-phase AC power supply is in a negative-phase sequence.

However, these reverse rotation preventing devices add to a cost on a finished apparatus.

SUMMARY OF THE INVENTION

It is accordingly the object of the present invention to provide an air-conditioning apparatus which incurs no high cost, can prevent an abnormal operation of a compressor when a three-phase AC power supply is in a negative-phase sequence, and can provide ready maintenance and service.

According to the present invention, there is provided an air-conditioning apparatus comprising:

a device, provided at at least one of indoor and outdoor units, for preparing a serial signal corresponding to to-be-transmitted information in synchronism with a first line voltage of a three-phase alternating-current power supply and for transmitting the serial signal to the other unit;

a device, provided at at least one of the indoor and outdoor units, for receiving the serial signal sent from the corresponding unit and determining the contents of the serial signal;

a device for detecting one of second and third line voltages of the three-phase alternating-current power supply;

a device for detecting a difference between a phase angle of the detected line voltage and that of the serial signal;

a device for comparing the detected difference and set valves;

a device for determining, in accordance with the result of comparison, whether the three-phase alternating-current power supply is in a positive-phase sequence or in a negative-phase sequence; and a device for inhibiting an operation of an compressor when the negative-phase is determined by the determining unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a diagrammatical view showing a control circuit of the present embodiment;

DETAILED DESCRIPTION OF THE PREFERRED EMBODIMENT

An embodiment of the present invention will be explained below with reference to the accompanying drawings.

Figure 1:
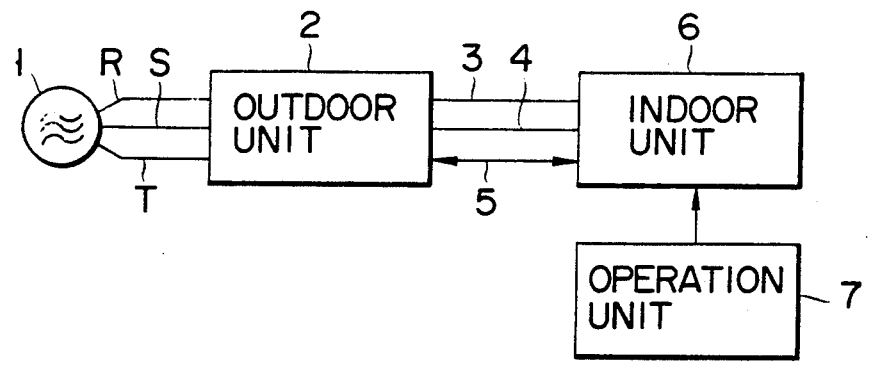
FIG. 1 is a view generally showing an air-conditioning apparatus according to an embodiment of the present invention.

In FIG. 1, a three-phase AC power supply 1 has three phases R, S and T. An outdoor unit 2 is connected to the power supply 1 and an indoor unit 6 is connected through power supply lines 3, 4 and through a serial signal line 5 to the outdoor unit 2.

An operation unit 7 is connected to the operation unit 6.

Figure 2:
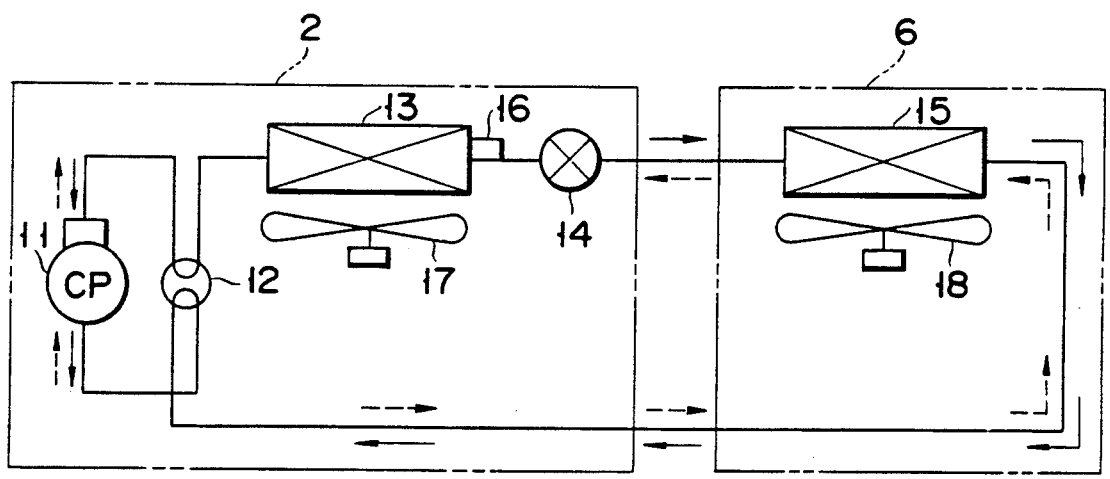
FIG. 2 is a diagrammatical view showing a refrigerating machine of the present embodiment.

A heat pump type refrigerating machine as shown in FIG. 2 is provided in the outdoor unit 2 and indoor unit 6.

In FIG. 2, reference numeral 11 shows a compressor 11 which is driven by the power supply 1.

An outdoor heat exchanger 13 is connected via a four-way valve 12 to a delivery port of the compressor 1.

An indoor heat exchanger 15 is connected through an expansion valve 14 to the outdoor heat exchanger 13.

A suction port of the compressor 11 is connected via the four-way valve 12 to the indoor heat exchanger 15.

At a time of cooling operation, a refrigerant delivered from the compressor 11 flows into the outdoor heat exchanger 13 via the four-way valve 12 as indicted by solid-arrows in FIG. 2.

The refrigerant entering the outdoor heat exchanger 13 is condensed through a release of heat into outdoor air.

The refrigerant passing through the outdoor heat exchanger 13 enters the indoor heat exchanger 15 after it has been pressure-reduced by the expansion valve 14.

The refrigerant entering the indoor heat exchanger 15 is evaporated through a heat absorption from the indoor air.

The refrigerant flowing past the indoor heat exchanger 15 is sucked into the compressor 11 past the four-way valve 12.

At a time of heating operation, the refrigerant delivered from the compressor 11 enters the indoor heat exchanger 15 past the four-way valve 12 as indicated by broken-line arrows in FIG. 2.

The refrigerant entering the indoor heat exchanger 15 is condensed through the release of heat into the indoor air.

The refrigerant leaving the indoor heat exchanger 15 enters the outdoor heat exchanger 13 after it has been pressure-reduced by the expansion valve 14.

The refrigerant entering the outdoor heat exchanger 13 is evaporated through the heat absorption from the outdoor air.

The refrigerant leaving the outdoor heat exchanger 13 is sucked into the compressor 11 past the four-way valve 12.

A temperature sensor 16 is mounted on the outdoor heat exchanger 13.

An outdoor fan 17 is provided near the outdoor heat exchanger 13.

An indoor fan 18 is provided near the indoor heat exchanger 15.

A control circuit of the present embodiment is shown in FIG. 3.

A terminal plate 21 is connected to the power supply 1 and has three terminals , and corresponding to the phases R, S and T of the power supply 1.

A drive motor 11M of the compressor 11, hereinafter referred to as a compressor motor, is connected to the terminals , and of the terminal plate 21 through normally open contacts 36a, 36a and 36a of an electromaqnetic contactor 36 as will be set out below.

A drive motor 17M in the outdoor fan 17 is connected to the terminals and of the terminal plate 21 through a normally open contact 37a of an electromagnetic contactor 37 as will be set out below.

The four-way valve 12 is connected to the terminals and of the terminal plate 21 through a normally open contact 38a of an electromagnetic contactor 38 as will be set out below.

A power supply terminal of the outdoor control section 40 is connected to the terminals and of the terminal plate 21 through a step-down transformer 22.

The outdoor control section 40 includes a microcomputer mainly comprised of a CPU 41 and memory 42, its peripheral circuits, timer 43 and counter 44 and controls not only the compressor motor 11M but also various parts of the outdoor unit 2 generally.

The cathode of a light emitting diode 23a of a transmitting circuit 23 is connected to an output port $P_1$ of the outdoor control section 40. A DC voltage Vd is applied across the anode and cathode of a light emitting diode 23a via a resistor 24.

The transmitting circuit 23 comprises a photoswitch comprised of the light emitting diode 23a on the primary side and a photodiode 23b on the secondary side, and the photodiode 23b is turned on upon the light emission of the light emitting diode 23a.

The collector of a phototransistor 25b in a receiving circuit 25 is connected to an input port $P_2$ of the outdoor control section 40. A DC voltage Vd is applied across the collector and the emitter of the phototransistor 25b via a resistor 26.

The receiving circuit 25 comprises a photo-coupler comprised of a light emitting diode 25a on the primary side and phototransistor 25b on the secondary side. The phototransistor 25b is turned on through the light emission of the light emitting diode 25a.

The collector of the phototransistor 27 in a line voltage detector circuit 27 is connected to an input port $P_3$ of the outdoor control section 40 and a DC voltage Vd is applied between the collector and emitter of the phototransistor 27b via a resistor 28.

The line voltage detector circuit 27 comprises a photocoupler comprised of a photodiode 27a on the primary side and phototransistor 27b on the secondary side. The phototransistor 27b is turned on through the light emission of the light emitting diode 27a.

Terminals and of a terminal plate 29 are connected to the terminals and of the terminal plate 21.

The cathode of the photodiode 23b is connected to a terminal of the terminal plate 29 via a resistor 30 and forward-biased diode 31. The anode of the photodiode 23b is connected to the terminal of the terminal diode 23b.

The cathode of the light emitting diode 25a is connected to the terminal of the terminal plate 29. The anode of the photodiode 25a is connected to the terminal of the terminal plate 29 via a resistor 32 and forward-biased diode 33.

The cathode of the light emitting diode 27a is connected to the terminal of the terminal plate 21 through a resistor 34 and forward-biased diode 35. The anode of the light emitting diode 27a is connected to the terminal of the terminal plate 29.

The temperature sensor 16 and electromagnetic contactors 36, 37 and 38 are connected to the outdoor control section 40.

The arrangement of the outdoor unit 2 has thus far been explained in conjunction with the present embodiment.

Terminals and of a terminal plate 51 in the indoor unit 6 are connected to the terminals and of the terminal plate 29 through two power supply lines 3 and 4.

A terminal of the terminal plate 51 is connected to the terminal of the terminal plate 29 via the serial signal line 5.

A drive motor 18M of an indoor fan 18 is connected to the terminals and of the terminal plate 51 through a normally open contact 66a of a later-described electromagnetic contactor 66 and bidirectional contact 67a of a later-described electromagnetic contactor 67.

A drive motor 18M has a high-speed tap Th and a low-speed tap Tl. The high-speed tap Th is connected to a normally closed side of the bidirectional contact 67a and the low speed tap Tl is connected to a normally open side of the bidirectional contact 67a.

A power supply terminal of an indoor control section 70 is connected to the terminals and of the terminal plate 51 through a step-down transformer 52.

The indoor control section 70 comprises a microcomputer mainly comprised of a CPU 71 and memory 72 and its peripheral circuits and controls the associated parts generally.

The cathode of a light emitting diode 53a in a transmitting circuit 53 is connected to an output port $P_1$ of the indoor control section 70. A DC voltage is applied between the cathode and anode of the light emitting diode 53a via a resistor 54.

The transmitting circuit 53 comprises a photoswitch comprised of the light emitting diode 53a on the primary side and photodiode 53b on the secondary side. The photodiode 53b is turned on through the light emission of the light emitting diode 53a.

The collector of the phototransistor 55b in a receiving circuit 55 is connected to an input port $P_2$ of the indoor control section 70. A Dc voltage Vd is connected between the collector and emitter of the phototransistor 55b via a resistor 56.

The receiving circuit 55 comprises a photocoupler comprised of a light emitting diode 55a on the primary side and phototransistor 55b on the secondary side. The phototransistor 55b is turned on through the light emission of the light emitting diode 55a.

The collector of a phototransistor 57b in a synchronizing generator circuit 57 is connected to an input port $P_3$ of the indoor control section 70. A DC voltage Vd is applied between the collector and the emitter of the phototransistor 57b via a resistor 58.

The synchronizing signal generator circuit 57 comprises a photocoupler comprised of a light emitting diode 57a on the primary side and phototransistor 57b on the secondary side. The phototransistor 57b is turned on through the light emission of the light emitting diode 57a to generate a power supply voltage synchronizing signal synchronizing with a first line voltage Vrs.

The cathode of the photodiode 53b is connected to the terminal of the terminal plate 51 via a resistor 59 and forward-biased diode 60. The anode of the photodiode 53b is connected to the terminal of the terminal plate 51.

The cathode of the light emitting diode 55a is connected to the terminal of the terminal plate 51. The anode of the light emitting diode 55a is connected to the terminal of the terminal plate 51 through a resistor 61 and forward-biased diode 62.

The cathode of the light emitting diode 57a is connected to the terminal of the terminal plate 51. The anode of the light emitting diode 57a is connected to the terminal of the terminal plate 51 through a resistor 63 and forward-biased diode 64.

An operation unit 7, indoor temperature sensor 65 and electromagnetic contactors 66 and 67 are connected to the indoor control section.

The indoor control section 70 performs the following functions (1) to (3).

(1) The function for preparing a serial signal corresponding to to-be-transmitted information (information based on an operation of the operation unit 7 and a detection temperature of the indoor temperature sensor 65) in synchronism with a power supply voltage synchronizing signal and transmitting it to the outdoor unit 2.

(2) The function for receiving, at a location of the receiving circuit 55, a serial signal transmitted from the outdoor unit 2 and determining the contents of the serial signal.

(3) The function for controlling the electromagnetic contactors 66 and 67 in accordance with the contents determined.

These functions of the indoor control section 70 are performed by a program stored in memory 72.

The outdoor control unit 40 performs the following functions (1) to (7).

(1) The function for receiving, at a location of the receiving circuit 25, the serial signal sent from the indoor unit 6 and determining the contents of the serial signal.

(2) The function for controlling the electromagnetic contactors 36, 37 and 38 in accordance with the contents determined.

(3) The function for preparing a serial signal corresponding to to-be-transmitted information (for example, a detection temperature of the temperature sensor 16) in accordance with the received serial signal and transmitting the serial signal to the indoor unit 6.

(4) The function for detecting a difference t between a phase angle of a line voltage Vtr detected at the line voltage detector circuit 27 and a phase angle of the received serial signal.

(5) The function for comparing the detected difference t with set values ($\alpha, \beta$). It is to be noted that the set values $\alpha, \beta$ stored in memory 42 have a relation $\alpha < \beta$.

(6) The function for determining, in accordance with a result of comparison, whether the power supply 1 is in a positive-phase sequence or in a negative-phase sequence.

(7) The function for inhibiting the operation of the compressor 11 when the negative-phase sequence is determined.

The function of the outdoor control section 40 is to run a program as stored in memory 42.

The operation of the air-conditioning apparatus will be explained in more detail below.

Figure 4:
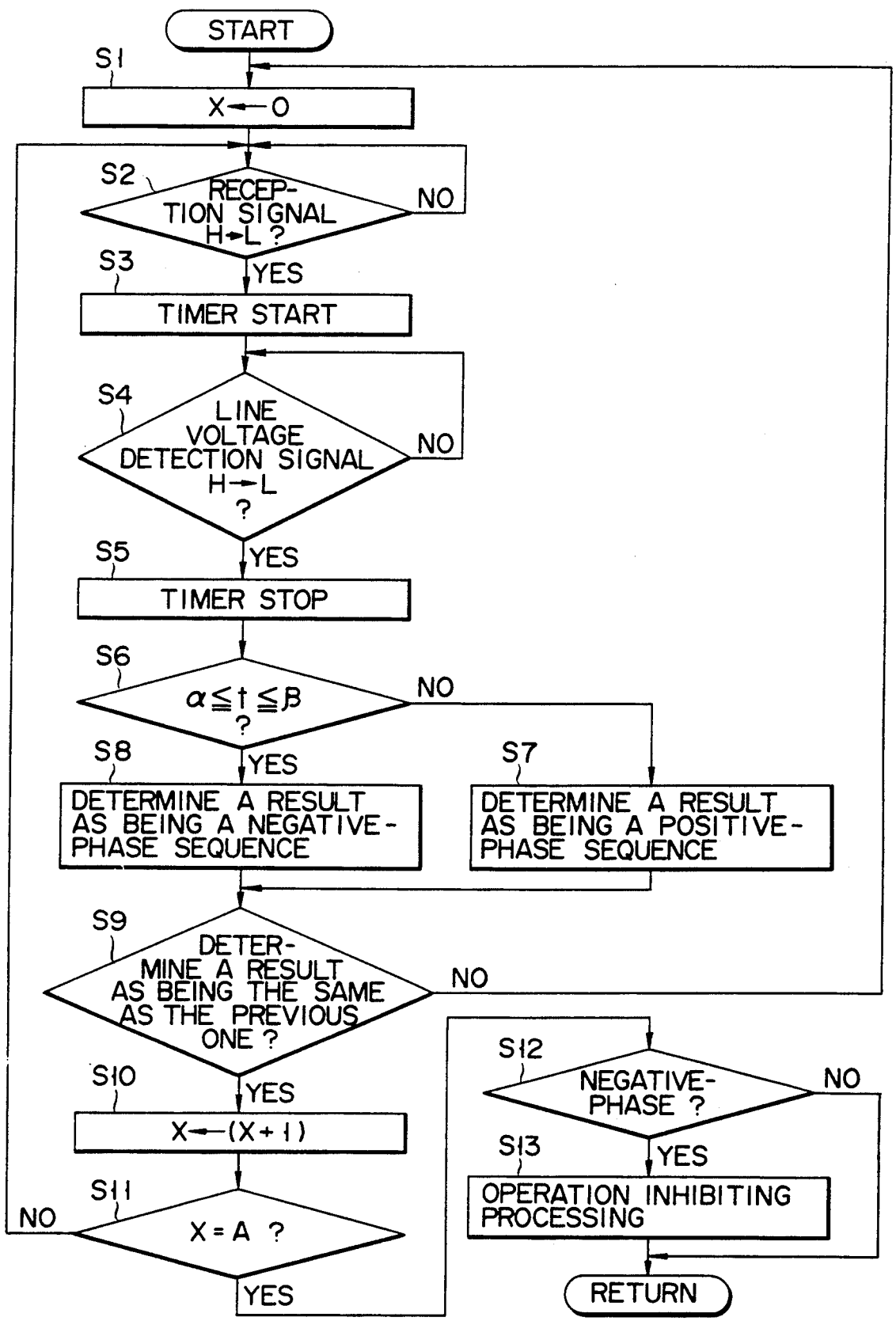
FIG. 4 is a flow chart for explaining the operation of the present embodiment.
Figure 5:
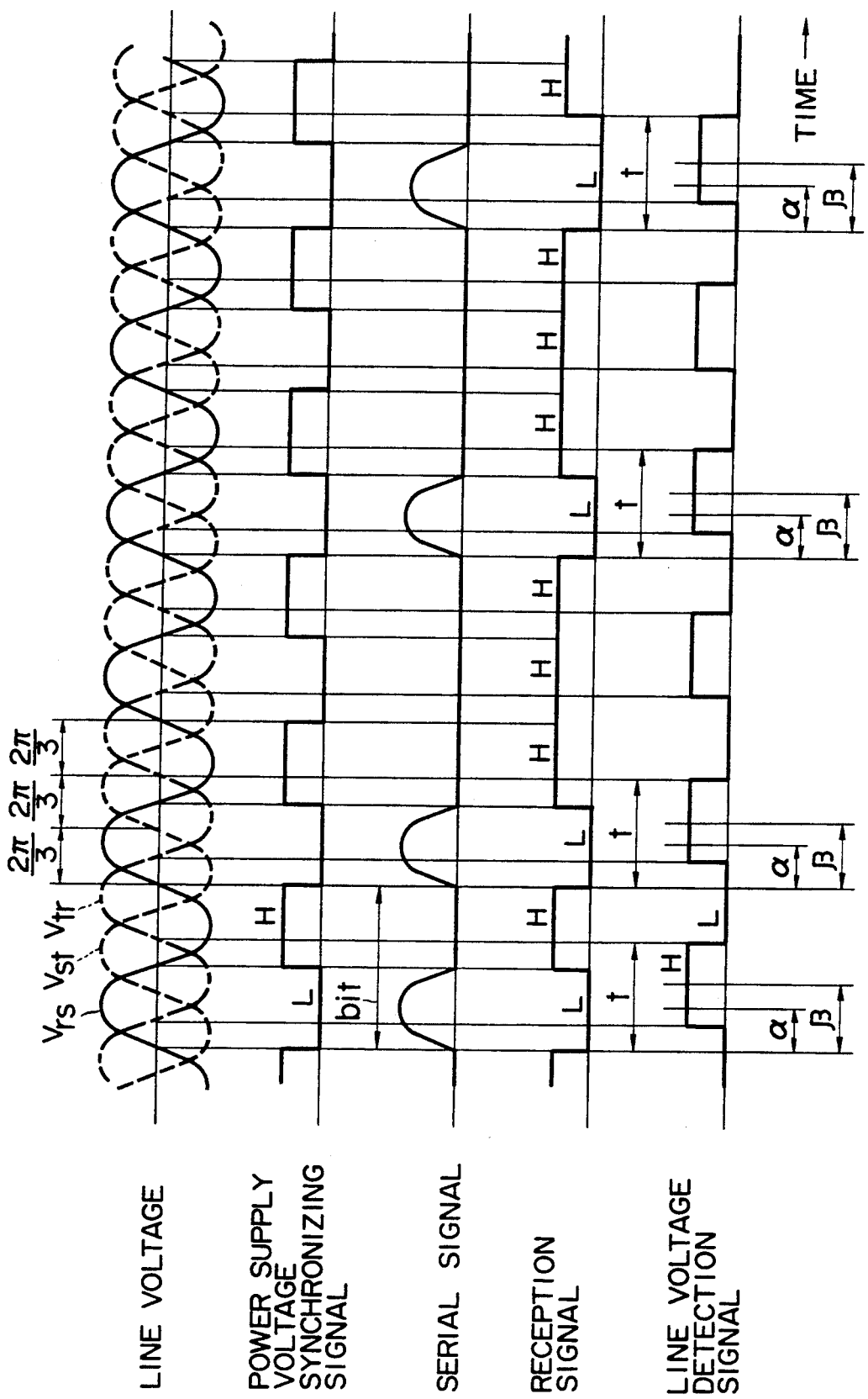
FIG. 5 is a time chart for explaining the function of the present invention at a time of a positive-phase sequence.

The operation of the apparatus when the power supply 1 is in the positive-phase sequence will be explained below with reference to a flow chart of FIG. 4 and time chart of FIG. 5.

With the power supply 1 on, first, second and third line voltages Vrs, Vst and Vtr are produced.

A power supply voltage synchronizing signal is generated from the synchronizing signal generator circuit 57 and it becomes a low "L" level when the line voltage Vrs is at a positive level and becomes a high "H" level when the line voltage Vrs is at a negative level.

The indoor control section 70 prepares information signal whose one bit synchronizes with one cycle of the power supply voltage synchronizing signal and turns the transmitting circuit 53 on and off in accordance with the information signal to prepare a serial signal in accordance with the presence or absence of a one-half cycle signal (positive signal) of the line voltage Vrs.

The prepared serial signal is supplied through the power supply line 3 and serial signal line 5 to the outdoor unit 2 and received by the receiving circuit 23. The received signal is sent to the input port $P_2$ of the outdoor control section 40.

The outdoor control section 40 determines the contents of the received signal and performs various control functions.

With the electromagnetic contactor 36 energized, for example, the contact 36a is closed to connect the compressor motor 11M to the power supply 11. By so doing, the compressor motor 11M is driven to operate the compressor 11.

With the electromagnetic contactor 36 deenergized, the contact 36a is opened, causing the compressor motor 11M to be interrupted from the power supply 1. As a result, the compressor motor 11M is stopped, rendering the compressor 11 in the off state.

With the electromagnetic contactor 37 energized, the contact 37a is closed to connect the outdoor fan motor 17M to the power supply 1. As a result, the outdoor fan motor 17M is driven to operate the outdoor fan motor 17.

With the electromagnetic contactor 37 deenergized, the contact 37a is opened, interrupting the outdoor fan motor 17M from the power supply 1. As a result, the outdoor fan motor 17M is stopped, turning the outdoor fan 17 off.

With the electromagnetic contactor 38 energized, the contactor 38a is closed, connecting the four-way valve 12 to the power supply 1 so that the four-way valve 12 is switchingly turned on.

With the electromagnetic contactor 38 deenergized, the contact 38a is opened, interrupting the four-way valve 12 from the power supply 1. As a result, the four-way valve 12 is switchingly turned off.

The outdoor control section 40 synchronizes with the received signal (that is, the serial signal) to prepare information signal whose one bit synchronizes with one cycle of a power supply voltage synchronizing signal and controls the transmitting circuit 23 in on-off fashion in accordance with the information signal and prepares a serial signal in accordance with a one-half cycle signal (negative level) of the line voltage Vrs.

The serial signal thus prepared is supplied through the power supply line 4 and the serial signal line 5 to the indoor unit 6 at the receiving circuit 55. The received signal is supplied to the input port $P_2$ of the indoor control unit 70.

The indoor control section 70 determines the contents of the received signal and performs various control operations.

With the electromagnetic contactor 66 energized, for example, the contact 66a is closed, connecting the indoor fan motor 18M to the power supply 1. As a result, the indoor fan motor 18M is driven to operate the indoor fan 18.

If, in this case, the electromagnetic contactor 67 is deenergized, the high-speed tap Th of the indoor fan motor 18M is connected to the power supply 1 through the normally closed side of the contact 67a. As a result, the indoor fan 18 is rotated at high speed.

With the electromagnetic contactor 67 energized, the low-speed tap Tl of the indoor fan motor 18M is connected to the power supply 1 through the normally opened side of the contact 67, driving the indoor fan 18 at low speed.

With the electromagnetic contactor 66 deenergized, the contact 66a is opened to interrupt the indoor fan motor 18M from the power supply 1. As a result, the indoor fan motor 18M is stopped and the indoor fan 18 is turned off.

A line voltage detection signal is generated from the line voltage detector circuit 27 in the outdoor unit 2.

The line voltage signal becomes a low "L" level when the line voltage Vtr is at a positive level and a high "H" level when the line voltage Vtr is at a negative level.

The outdoor control section 40 clears a count value X of the counter 44 with the power supply 1 on (step S1) and performs the following control operations.

The outdoor control section 40 monitors a fall from a "H" level of the received signal from the input port $P_2$ to a "L" level—step S2.

When the received signal falls from the "H" level to the "L" level, the timer 43 starts, initiating the measurement of a time t—step S3.

The outdoor control section 40 monitors a fall from a "H" level of a line voltage detection signal from the input port $P_3$ to a "L" level—step S4.

When the line voltage detection signal falls from the "H" level to the "L" level, the time 43 is stopped, terminating the measurement of the time t—step S5.

Here the time t corresponds to a difference between the phase angle of the line voltage Vrs and that of the line voltage Vtr.

The outdoor control section 40 compares the time t with the set values $\alpha$, $\beta$—step S6.

If, as a result of comparison, the time t is found to be greater than the set values $\alpha$ and $\beta$, the power supply 1 is determined to be in a positive-phase sequence—step S7.

The outdoor control section ascertains whether or not this determination is the same as the preceding one (step S9) and, if so, "1" is added to a count value X of the counter 44 (step S10). Control is returned back to step S2 to repeat the same sequence.

If the count value X of the counter 44 reaches, for example, "3" as a set value A, that is, the three determinations are all in the positive-phase sequence, a final determination is made.

In this case, the operation of the apparatus continues.

Figure 6:
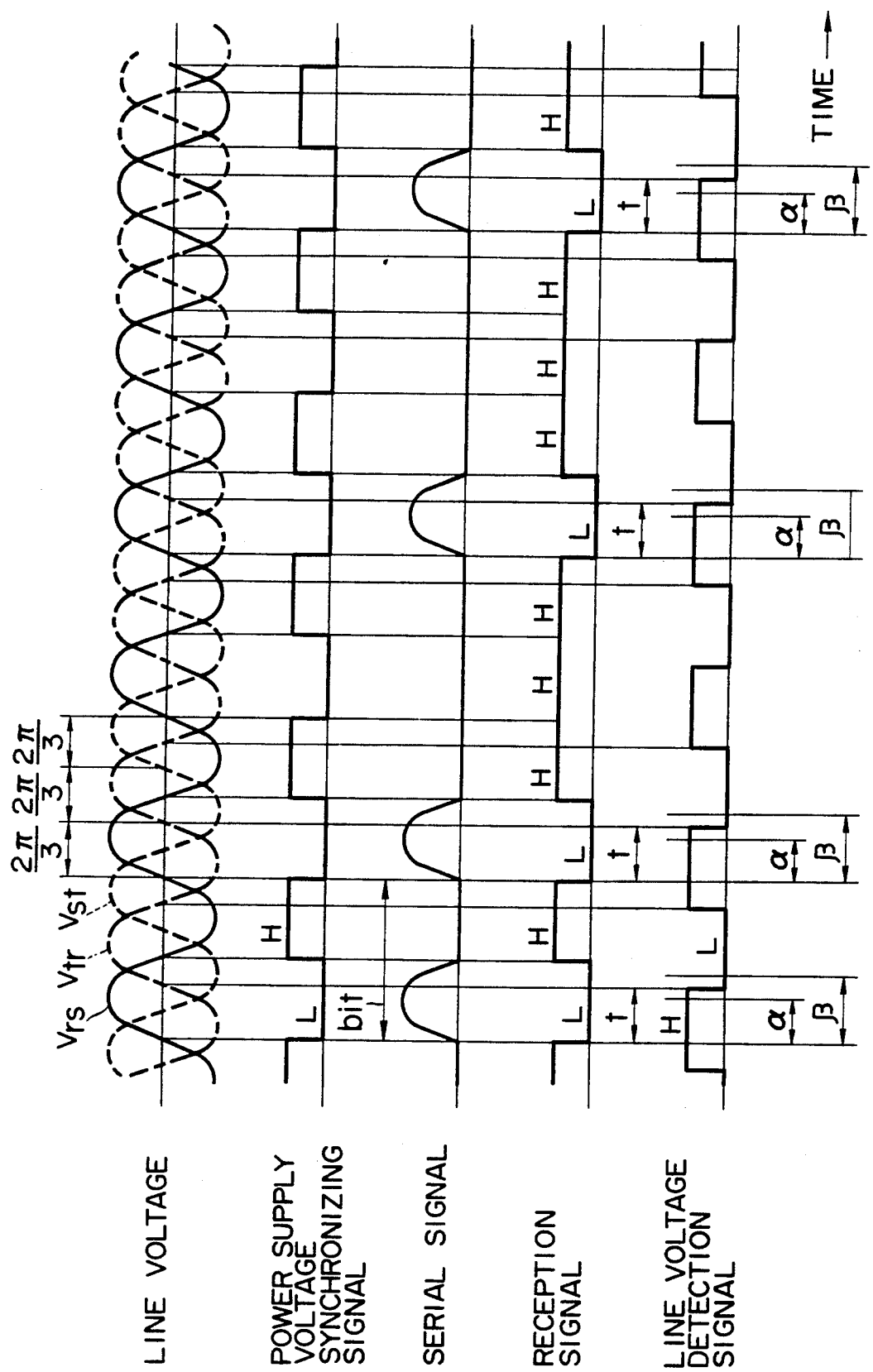
FIG. 6 is a time chart for explaining the function of the present invention at a time of a negative-phase sequence.

The operation of the apparatus when the power supply 1 is in a negative-phase sequence will be explained below with reference to the flow chart of FIG. 4 and time chart of FIG. 6.

When a negative-phase sequence emerges at the power supply 1, it follows, as a comparison at step S6, that the time t of the timer 43 is equal to or greater than the set value $\alpha$ and equal to or smaller than the set value $\beta$, that is, $\alpha \leq t \leq \beta$. At this step, it is determined that the power supply 1 is in the negative-phase sequence—step S8.

Whether the determination is the same as the preceding one or not is ascertained at step S9 and, if the answer is in the affirmative, "1" is added to the count value X of the counter 44 (Step S10). Control is returned back to step S2 to repeat the same operation.

If the count value X of the count 44 reaches, for example, "3", that is, if the three determinations are all in a negative-phase sequence (step S12), it is finally determined that the power supply 1 is in the negative-phase sequence.

In this case, an operation inhibiting operation is carried out (Step S13).

That is, in the operation inhibiting operation, the electromagnetic contactor 36 is forced into a deenergized state, inhibiting the operation of the compressor motor 11M and hence the compressor 11.

Thus any torque opposite to a normal is not generated in the drive motor 11M, preventing an abnormal operation at the compressor 11.

In particular, the present apparatus does not use any conventional high reverse rotation preventing device and needs only to include the line voltage detector circuit 27 and outdoor control section 40, thus incurring no added cost. It is also easy to provide maintenance and repair.

It is possible to detect both the line voltage Vrs and line voltage Vtr and determine the positive- or the negative-phase sequence from a difference between these voltages. According to the present invention, a serial signal as originally used in the present apparatus is utilized, without detecting the line voltage Vrs, making the resultant apparatus simpler in construction and lower in cost.

Although, in the aforementioned embodiment, the line voltage Vtr has been explained as being detected by the line voltage detector circuit 27, it may be possible to detect a line voltage Vst instead.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air-conditioning apparatus, including an indoor unit and an outdoor unit having its compressor driven by a three-phase alternating-current power supply, comprising:

means, provided at at least one of the units, for preparing a serial signal corresponding to to-be-transmitted information in synchronism with a first line voltage of the three-phase alternating-current power supply and for transmitting the serial signal to the other unit;

means, provided at at least one of the units, for receiving the serial signal sent from the corresponding unit and determining the contents of the serial signal;

means for detecting one of a second and a third line voltages of the three-phase alternating-current power supply;

means for detecting a difference between a phase angle of the detected line voltage and that of the serial signal;

means for comparing the detected difference with set values;

means for determining, in accordance with the result of comparison, whether the three-phase alternating-current power supply is in a positive-phase sequence or in a negative-phase sequence; and means for inhibiting an operation of the compressor when the negative-phase sequence is determined by the determining means.

2. An apparatus according to claim 1, wherein said indoor unit is connected to said three-phase alternating-current power supply.

3. An apparatus according to claim 2, wherein said indoor unit is connected to said outdoor unit through two power supply lines and a serial signal line.

4. An apparatus according to claim 3, wherein said serial signal passes through said serial signal line and one of said power supply lines.

5. An apparatus according to claim 1, further comprising a heat pump type refrigerating machine connected to said compressor, to a four-way valve, a outdoor heat exchanger and expansion valve in said outdoor unit and to an indoor heat exchanger in said indoor unit.

6. An apparatus according to claim 5, wherein an outdoor fan is located near said outdoor heat exchanger.

7. An apparatus according to claim 5, wherein an indoor fan is located near said indoor heat exchanger.

8. An apparatus according to claim 7, wherein a drive motor in said indoor fan includes a high speed tap and low speed tap.

* * * * *